United States Patent
Chung et al.

(10) Patent No.: US 9,888,382 B2
(45) Date of Patent: Feb. 6, 2018

(54) MOBILE DATA COMMUNICATION USING BIOMETRIC ENCRYPTION

(71) Applicants: Michael Chung, Gaithersburg, MD (US); Sen-Ching Cheung, Lexington, KY (US); Washington Software, Inc., Germantown, MD (US)

(72) Inventors: Michael Hing Ping Chung, Gaithersburg, MD (US); Sen-Ching Samson Cheung, Lexington, KY (US); Zhuoshi Wei, Montgomery Village, MD (US)

(73) Assignee: Washington Software, Inc., Germantown, MD (US)

( * ) Notice: Subject to any disclaimer, the term of this patent is extended or adjusted under 35 U.S.C. 154(b) by 101 days.

(21) Appl. No.: 14/865,760

(22) Filed: Sep. 25, 2015

(65) Prior Publication Data
US 2016/0100314 A1   Apr. 7, 2016

Related U.S. Application Data

(60) Provisional application No. 62/058,283, filed on Oct. 1, 2014.

(51) Int. Cl.
*H04L 29/06*     (2006.01)
*H04W 12/06*     (2009.01)
(Continued)

(52) U.S. Cl.
CPC ........ *H04W 12/06* (2013.01); *G06F 21/6245* (2013.01); *H04L 9/0866* (2013.01);
(Continued)

(58) Field of Classification Search
CPC . H04L 63/061; H04L 63/0861; H04L 9/3231; H04L 51/38; H04L 63/0442;
(Continued)

(56) References Cited

U.S. PATENT DOCUMENTS

| | | | | |
|---|---|---|---|---|
| 2003/0140235 A1* | 7/2003 | Immega | ................ | G06F 21/32 713/186 |
| 2007/0014409 A1* | 1/2007 | Batra | ...................... | H04B 5/02 380/270 |

(Continued)

*Primary Examiner* — Tri Tran
(74) *Attorney, Agent, or Firm* — IP-R-US, LLC; Peter S. Wong

(57) ABSTRACT

A mobile App using biometric encryption and decryption for privacy and security having both authentication and recognition functions. It utilizes the built-in camera of the mobile device to provide facial images for authentication purposes. It further includes a secured data communication system for conveniently sending and receiving data on the mobile devices. The secured data communication system also utilizes biometric encryption and decryption technology for granting permissions to access the data communication system. The biometric encryption is implemented by using a selective biometric feature and optimized biometric feature detection and tracking methods. Different biometric feature authentication methods are optimized for use on various mobile platforms, such as, Android, iOS, Windows and others. Data encryption and decryption are achieved by using selected biometric feature vectors as cryptographic keys. The biometric data encryption system further includes liveness detection module with anti-spoofing features to ensure the encryption and decryption processes only accept biometric features from a live person conveniently without the user's intervention. Alternative authentication method is provided if the biometric feature authentication module fails to recognize the valid user, or fails in the liveness detection module in order to maintain privacy and security of the data in the mobile device.

11 Claims, 2 Drawing Sheets

(51) Int. Cl.
| | |
|---|---|
| *H04L 9/32* | (2006.01) |
| *G06F 21/62* | (2013.01) |
| *H04W 12/04* | (2009.01) |
| *H04W 12/02* | (2009.01) |
| *H04L 9/08* | (2006.01) |
| *H04L 12/58* | (2006.01) |

(52) U.S. Cl.
 CPC ........ *H04L 9/3231* (2013.01); *H04L 63/0442* (2013.01); *H04L 63/061* (2013.01); *H04L 63/0861* (2013.01); *H04W 12/02* (2013.01); *H04W 12/04* (2013.01); *H04L 51/38* (2013.01); *H04L 2209/80* (2013.01)

(58) Field of Classification Search
 CPC ..... H04W 12/04; H04W 12/02; H04W 12/06; G06F 21/6245
 See application file for complete search history.

(56) References Cited

U.S. PATENT DOCUMENTS

| | | | | |
|---|---|---|---|---|
| 2012/0136793 | A1* | 5/2012 | Valin | ...... G06Q 20/10 705/53 |
| 2013/0015946 | A1* | 1/2013 | Lau | ......... G07C 9/00 340/5.2 |
| 2016/0065571 | A1* | 3/2016 | Hoyos | .................... G06F 21/32 713/168 |

* cited by examiner

MOBILE DATA COMMUNICATION USING BIOMETRIC ENCRYPTION

CROSS-REFERENCE TO RELATED APPLICATION

This application claims the benefit of U.S. Provisional Application No. 62/058,283, filed Oct. 1, 2014.

FIELD OF THE INVENTION

Network security breaches and identity thefts are common topics in the news nowadays. Despite the billions of dollars invested in IT security technology each year, countless corporations, enterprises and government agencies have fallen victim to cyber-attacks of incredible sophistication and complexity. Private citizens and consumers using computers and mobile devices are also not immune to such vulnerability. In particular, mobile devices, such as, smartphones and tablets are very personal communication devices. Millions of people share and store their personal information, such as, photos, bank accounts, financial data and e-mail/SMS messages, using their mobile devices. As a result, such personal information is potentially vulnerable to unauthorized access by hackers. Such incidents always lead to inconvenience and potential financial losses. Evidently, there is an imminent need for protecting the privacy of mobile device users and the data security of their mobile devices.

One objective of the present invention is to meet the convenience, privacy and security challenges of users by providing them a mobile device with a secured data communication.

Another objective of the present invention is to offer an enhanced and secured data communication protection, e.g. utilizing biometric encryption for data exchanges including streaming, emails and messaging.

Another objective of the present invention is to develop an e-mail/SMS messaging and other communication services utilizing various biometric patterns, such as, iris, speech, facial, fingerprint, and heartbeat, etc.

Another objective of the present invention is to develop a convenient and secured program, which is utilized as a covered layer protection for other software program.

Another objective of the invention is to develop a highly sophisticated secure communication software program tailored for corporation, enterprise and government use.

Yet another objective of the present invention is to develop a secured data communication application (App) to be released in, such as, Google Play, Apple App Store, Windows Apps Store and Amazon Appstore.

BACKGROUND OF THE INVENTION

Mobile devices have made a revolutionary impact on the way we live, work and socialize. The development of applications or Apps on mobile devices has been increasing exponentially over the past few years due to the popularity of smartphones and tablets. The features and functions of mobile devices have extended far beyond just emailing and web browsing. They are often used to take/post photos and videos, texting, audio and video calls, group chatting, access social media, access financial accounts, play games, stream music and movies, and run various custom applications. Along with their great convenience and efficiency, there are growing security challenges in protecting the privacy of the users and the sensitive data stored in these mobile devices.

There are two types of encryption: symmetric and asymmetric. 1). Symmetric encryption, such as, Advanced Encryption Standard (AES), uses the same key for encryption and decryption. 2). RSA (by Ron Rivest, Adi Shamir, and Leonard Adleman) asymmetric encryption, uses different keys, both public and private. Encryption is a process of protecting data confidentiality by converting the data into an unreadable format, using an encryption key. Conversely, decryption is the reverse process of encryption to uncover the encrypted data, using a decryption key, possibly different from the encryption key. The cryptographic keys are usually long and random, not practical for human to memorize. For example, the Advanced Encryption Standard (AES) key is 128 bits long, in accordance with federal information processing standards publication 197, National Institute of Standards and Technology (NIST), 2001. Such cryptographic keys are usually stored in a location, where an alternative authentication, e.g., a PIN or a password is required to release the key, in order to avoid the risk of losing or forgetting the cryptographic key.

Biometric patterns including human physiological or behavioral characteristics can be used to authenticate mobile device users. These patterns usually include biometrics, such as, face, fingerprint, iris, signature, and voice, among many others. They are either permanent or unchangeable for a long period of time. In the past, the use of such biometrics has been focusing on authentication of PC and network access, physical assess, time and attendance applications. They are often used in conjunction with other security technologies, such as authentication tokens and smart cards.

One solution is to use the emerging biometric encryption technology, which uses biometric information as the cryptographic keys. With biometric encryption, rather than storing the cryptographic keys in the system, the biometric information is serving as the cryptographic keys to encrypt the data, or binding the keys to the biometric information, so that only the biometric-encrypted data is stored. Among the existing works associated with biometric encryption, the major efforts are focusing on two biometric modalities, iris and fingerprints according to the papers written by Clancy R. C., Kiyavash N., and Lin D. J., "Secure Smart Card based Fingerprint Authentication," Proceedings of ACM SIGMM Workshop on Biometrics Methods and Applications, pp. 45-52, 2003; Uludag U., Pankanti S., and Jain A., "Fuzzy Vault for Fingerprints," Proceedings of International Conference on Audio and Video based Biometric Person Auth., pp. 310-319, 2005; and Yang S., and Verbauwhede, I., "Secure Fuzzy Vault based Fingerprint Verification System," Proceedings of ASILOMAR Conference on Sig., Sys., and Comp., Vol. 1, pp. 577-581, November 2004.

Other papers on biometric encryption include, Hao F., Anderson R., and Daugman J., "Combining Crypto with Biometric Effectively," IEEE Trans. on Computers, vol. 55, no. 9, pp. 1081-1088, 2006; Wu X., Qi N., and Wang K., Zhang D., "A Novel Cryptosystem based on Iris key Generation," 2008 IEEE Computer Society. Fourth international conference on natural computation; and Kanade S., Camara D., Krichen E., Petrovska-Delacretz D., and Dorizzi B., "Three Factor Scheme for Biometrics based Cryptographic Key Regeneration using Iris" Telecom & Management Sud-Paris Evry, France.

There are also several works on biometric encryption using facial images by Wang Y., and Plataniotis K. N., "Fuzzy Vault for Face based Cryptographic Key Generation," in Proc. Biometrics Symposium 2007, September 2007; and Martin K., Lu H., Bui F., Plataniotis K. N., and Hatzinakos D., "A Biometric Encryption System for the Self-exclusion Scenario of Face Recognition," IEEE Systems Journal, 2009.

While the above works are focused on modifying or improving the algorithms of encryption, one of the objectives of the present invention is focused on developing an App for secure mobile device data communication by utilizing such biometric encryption. With such an App, only the recipient of the data will be able to access the content upon one or more successful biometric feature authentication with the integral biometric detector of the mobile device.

Table 1 below shows the various mobile device, e.g. smartphone, operation system markets for the last two years in accordance to Gartner, Inc., a leading information technology research and advisory company.

As can be seen from the table, the Android market share reaches as high as 78.4% in year 2013, gaining a 12% growth as compared to year 2012, way ahead of other markets. The sales of Android phones will predict to approach one billion units in the year 2014, and the Android operating system will continue to benefit from this growth.

TABLE 1

Worldwide Smartphone Sales to End Users by Operating Systems

| Operating System | 2013 Units (Thousands) | 2013 Market Share (%) | 2012 Units (Thousands) | 2012 Market Share (%) |
|---|---|---|---|---|
| Android | 758,719.9 | 78.4 | 451,621.0 | 66.4 |
| iOS | 150,785.9 | 15.6 | 130,133.2 | 19.1 |
| Windows | 30,842.9 | 3.2 | 16,940.7 | 2.5 |
| BlackBerry | 18,605.9 | 1.9 | 34,210.3 | 5.0 |
| Other OS | 8,821.2 | 0.9 | 47,203.0 | 6.9 |
| Total | 967,775.8 | 100.0 | 680,108.2 | 100.0 |

Messaging Apps, such as, WhatsApp, WeChat, Line, Facebook messenger, Tango, and Skype, etc., are very popular mobile Apps for communication. These Apps share similar basic functions, one-to-one chatting, group chatting, sending or sharing files, and video chatting, etc. However, many of these Apps do not utilize any encryption for data protection, not to mention biometric encryption. They are usually installed on the device without any protection. As a result, once an unauthorized user gains access to the device, he/she will gain access to these popular mobile Apps without any effort.

SUMMARY OF THE INVENTION

One of the objectives of the present invention is to develop a mobile App that will be distinguished from existing popular Apps on the market by providing users with a secure data exchange mobile App, including texting, emails, images, and videos, as specified in the afore-mentioned objectives. Specifically, the present invention provides a secure means to protect data sent and received by mobile devices, using biometric encryption, e.g. fingerprints, voice, iris, and facial features. Nowadays, almost all mobile devices have at least one built-in camera, and some even have a biometric detector or sensor built-in. As such, the user's facial image or other biometric feature, such as, fingerprint, iris, voice, etc., is readily available for authentication purposes. Further, the present invention will provide data encryption and decryption on mobile devices using biometric features, e.g. facial images. When data is sent to a particular person, it will be encrypted using one or more of the recipient's biometric features as the cryptographic key. Upon receiving such encrypted data, the recipient can decrypt the data, for example, using his/her face pattern by placing the mobile device in front of the face. This could further protect user privacy and data security even though other users may somehow gain access to the recipient's mobile device. Furthermore, in order to cope with system vulnerability in spoof attack and to enhance robustness, a biometric liveness detection method is used to ensure the biometric feature received are coming from a live person.

The present invention addresses a number of privacy and data security issues. These issues are raised from the fact that most of the data stored in the phone, including email, contacts, social networking accounts, and identities are readily available to anyone who has access to the mobile device. Occasionally, the mobile device may be shared among multiple users, therefore, ensuring one user not be able to access other user's data is very important. The present invention provides a safeguard from losing valuable data and access of the mobile device by preventing the data access of the mobile device when the biometric liveness detector detects the user of the mobile device is not a real person or not the intended user. The present invention also prevents the potential risk of losing sensitive data or unauthorized access when the mobile device is lost, stolen or being hacked in public Wi-Fi hotspot locations, such as, coffee shops and airport lounges. Depending on the built-in biometric detector functions of the mobile device, other biometric features, such as, voice or iris patterns can be also incorporated into such encryption mobile App. Further, the present invention can be operated in any mobile platforms or operation systems, such as, those discussed in Table 1 above.

BRIEF DESCRIPTION OF THE DRAWINGS

Features, aspects, and embodiments are described in conjunction with the attached drawings, in which.

DETAILED DESCRIPTION OF THE INVENTION

Figure 1:
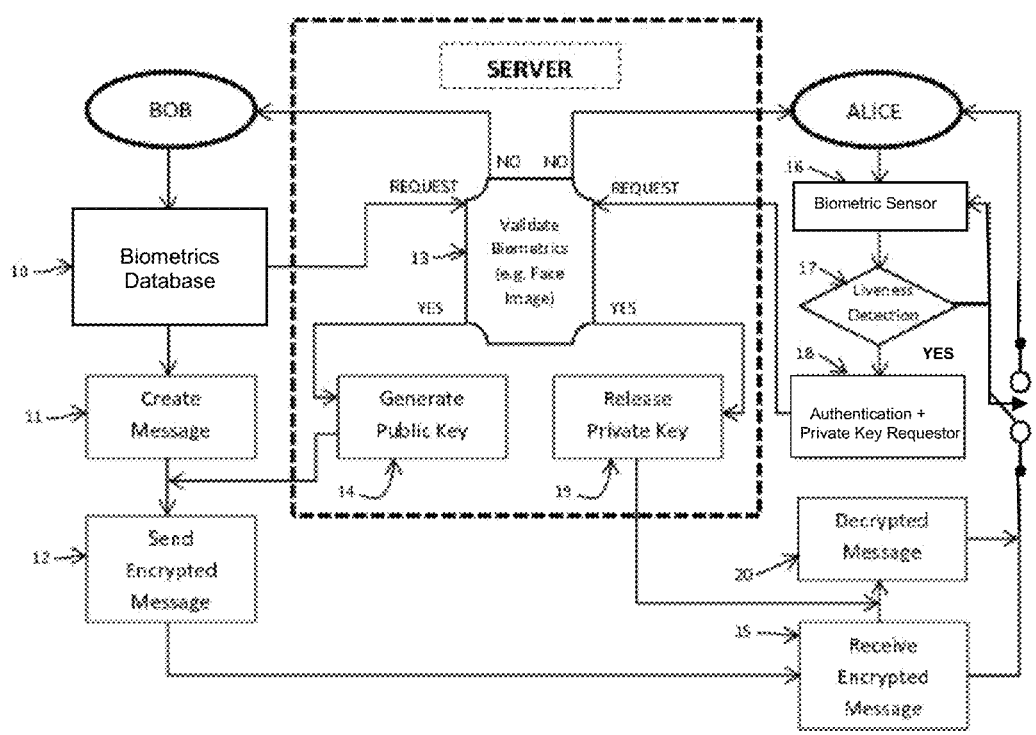
FIG. 1 is an example of the secured messaging process in accordance with the present invention.

The popularity of mobile devices, such as, smartphones and tablets gives rise to many issues that must be addressed for privacy and data security. Some examples are:

1) How to protect the personal and corporate data stored in the mobile devices, such as, emails, contacts, calendar, photos, audio and video files;
2) How to protect personal activities on the mobile device when it is shared with multiple users, ensuring one user cannot access other user's sensitive data and/or unauthorized access;
3) How to protect the mobile device if it is lost or stolen, preventing the potential loss; and
4) How to protect the mobile device from crackers/hackers when used in public Wi-Fi locations.

Using password for locking and preventing access to mobile devices is well known. However, password can be forgotten and can be cracked by sophisticated hackers. Once the password is cracked, one can easily access all the data in the mobile device. In order to overcome that, using data encryption is a much more secured alternative to combat the risk of unauthorized access of mobile devices. The common encryption process involves converting data into "ciphertext" with an encryption key using mathematical algorithm. In order to gain access to the encrypted data, users are required to use their own unique credentials, known as decryption key, to decrypt the "ciphertext". Provided the decryption key stays safe, it is virtually impossible for others to access or decrypt the encrypted data.

Biometric encryption is a process that generates a cryptographic key from biometric data or binds a cryptographic key to biometric data, so that neither the cryptographic key nor the biometric data needs to be stored. The decryption process requires a successful authentication of a genuine live biometric sample.

The present invention provides access to data on mobile devices, using biometric encryption. For example, with the built-in camera or other biometric detector on the mobile device, the user's facial image is readily available, which make the authentication process very convenient. In this particular example, data exchange are encrypted using the live facial image of the mobile device as the encryption key. The decryption process requires a successful facial authentication of the recipient, by presenting his/her face in front of the camera of the mobile device.

One aspect of the present invention is to develop a mobile App utilizing an optimized facial authentication method that is suitable for mobile platform in spite of the restricted computation power of most mobile devices. The facial authentication in this mobile App requires only simple yet accurate computation method to extract facial features in a very compact representation. It utilizes facial features provided on a mobile platform for data encryption and decryption, including a facial image liveness detection scheme to detect spoofing for preventing unauthorized access.

Another aspect of the present invention is to develop a mobile App which includes a secure messaging application using the biometric encryption features described above. As a result, the mobile App of the present invention will have a dual function of authentication in granting mobile device access to valid users, and to grant permission to read and send messages, access the contacts, and other selected functions or applications in the mobile device. The state-of-the-art method for facial detection is relatively mature. One such method is to use Haar-like features with Adaboost learning and cascade classification for face detection. This method has proven to be able to generate very fast and accurate results in accordance to the papers written by Viola P. A., and Jones M. J., "Robust Real-Time Face Detection," ICCV 2001: 747. For Android platform, the OpenCV library for Android SDK provides a basic function for facial detection using the above method. Accordingly, the present invention will adapt this method for facial detection in developing the App for the Android platform. Specifically, this method will be customized in the present invention to detect selected features on the face, such as, locating the areas of eyes, nose and mouth.

Figure 3:
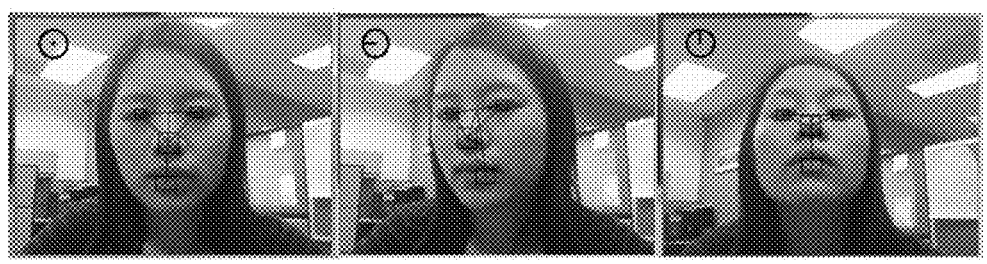
FIG. 3 is an example of the facial detection and tracking method used in the present invention.

The present invention also includes a face tracking module to facilitate the face liveness detection in the subsequent facial detection steps. Face tracking is initiated by the facial detection results, which include the location of the face, eyes, nose and mouth. Specific template matching methods are selected for face tracking Since it is known that tracking two consecutive frames of a video stream is highly relevant, the location of the face on the current frame will be determined by the best matched positions between the current frame and the previous frame. The template matching is performed by a distance measurement of corresponding pixels of the two consecutive frames. FIG. 3 shows some preliminary results of the face detection and tracking software implemented on the Android platform.

Facial recognition and facial authentication have subtle differences in terms of system settings. Facial recognition, also called identification, is to perform one-to-many comparison of an input facial image with a facial image template database. On the other hand, facial authentication, also called verification, is to perform one-to-one match that only compares the input facial image with the one that the user claims to be. In the present invention, facial authentication scheme is used since only the authorized user is allowed to access the data in the mobile device. One of the major problems of facial authentication is finding a proper method to convert the original facial images into a compact representation of the face, which is also known as face feature extraction.

Since the computation capability of a mobile device is limited, finding a facial authentication method that is computationally efficient while maintaining good performance accuracy is a challenge. A performance comparison of multiple methods shows that the Local Binary Pattern (LBP) method and its several modifications rank very high in the performance evaluation. More importantly, the LBP features of images are very efficient in computation, and also robust against illumination changes, resulting in a good candidate for mobile device application. Further, the LBP is a simple yet efficient texture operator which labels the pixels of an image by initiating the neighborhood of each pixel and considers the result as a binary number. When this method is applied to face feature extraction, it divides the image into blocks and computes each block using the operator to obtain a histogram representation of the face.

The OpenCV library provides the source code of the LBP method for face recognition. The LBP method can be customized and optimized based on the image data in the application, and the particular application platform. Accordingly, the present invention will implement and optimize this method for the facial authentication module on the Android platform.

As mentioned above, one key problem for biometric cryptosystem is that the feature vectors used during encryption may not exactly match that obtained at the time of decryption. As such, the naive approach of directly using the biometric feature vector as the key for encryption does not work. To cope with the variability in biometrics, the present invention utilizes, for example, an approach based on the sophistication of the biometric matching algorithms.

The approach focuses on distance-based matching algorithms—i.e. two biometric vectors x and y are considered to be a match if a distance function $d(x,y)$, typically L1 or L2, on the two vectors result in a small value. Specifically, $d(x,y) \leq \epsilon$, where $\epsilon$ is a pre-defined similarity threshold.

The aforementioned LBP feature vector together with the L1 distance is an example of such a matching algorithm. The approach involves the following steps:

1. Transform the biometric vectors x and y into unary encoding $U(x)$ and $U(y)$. Unary encoding is the transformation of the integer value $x_i$ at each dimension i into a binary representation with $x_i$ consecutive ones followed by zeros. For example, if $x_i=3$ and the maximum value of the dimension is 9, then the unary representation is as follows:

$$U(x_i) := 111\ 000\ 000$$

For real-value vectors, all values need to be quantized and shifted to non-negative values. The significance of this step is that L1 distance d(x,y) is preserved in this process, i.e. $d(x,y)=dH(U(x),U(y))$ where $dH(U(x),U(y))$ is the hamming distance. For L2 distance, the distance is not exactly preserved. However, the distortion is bounded and can be reduced with additional transformations;

2. Encrypt the secret message m, which could be a randomly generated encryption key for messaging, based on the following process:

$Enc(m; x):=ECC(m) \text{ XOR } U(x)$

The function ECC(m) represents an error correction coding that can correct up ∈ bits of error. In other words, any ∈ or fewer random bit flips in ECC(m) does not affect the decoding process. There are many robust, high-performance ECC implementations including Turbo Code or Reed-Solomon Code that can be used for this process. The XOR with the feature vector acts as a one-time pad, making decryption impossible without some knowledge of the biometric feature vector x; and 3. To decrypt the cipher-text, the receiver will use the following process:

$m':=ECC-1(Enc(m;x) \text{ XOR } U(y))$

It is easy to see why decryption works correctly. The XOR undoes the encryption with U(x) up to ∈ bits, provided that x and y are a match, which are then corrected by the inverse ECC process. The decryption has a very low computational complexity, which is ideal for mobile platforms.

Another objective of our present invention is to create an instant data exchange mobile App, which runs on multiple platforms, e.g. Android, Apple or Windows. The initial mobile App will have many useful features. Some of these features are as follows:

1. User registration;
2. User authentication;
3. Adding new friends by user name;
4. Approving friends;
5. Messaging with friends in an approved list;
6. Support video, voice and photo messages;
7. Shows online and offline users;
8. Able to receive offline messages;
9. Push new message for notification, even when the App is not active; and
10. Sign out of the App.

With the basic function of the instant mobile App created, the biometric data encryption and decryption features are incorporated into this App. The resulting mobile App will have the following additional features:

1. User is required to provide his/her specified biometric feature for authentication;
2. User has the option to enable data encryption for data exchange on the user mobile device; and
3. Preventing unauthorized user from using the mobile device, e.g. when the mobile device is lost or stolen.

If the option of data encryption is turned ON, the mobile App is bundled with the registered user. The data is encrypted with the registered user's biometric feature. For example, the mobile App will constantly check if the user is a registered user, using the built-in camera or other biometric detector on the device, e.g. using facial authentication. If the facial authentication is successful, the App will run normally. Otherwise, the App will not decrypt the data received, and the screen will show the data as "ciphertext".

Also, while the option of data encryption is ON, the data received on the user mobile device during this period is encrypted, even after the user has signed out of the application. No other unauthorized user can access the history on the remote server or stored in the mobile device.

If the authentication system does not have built-in liveness detection module, it is susceptible to spoofing attack. For example, it is a common way to use fake faces when the live biometric features used are facial images. Other common ways are as follows:

1. Photograph of a valid user. This is the cheapest and easiest spoofing approach, since it is very easy to obtain one's facial image from the public, either from online or taking a photo of the target user unknowingly;
2. Video of a valid user. Using video to spoof the camera is also a big threat. Video of a valid user can be very similar to live face, because it contains physiological characteristic, such as eye blinking, head movement, which is lacking in a photograph; and
3. 3D model of a valid user. A 3D face model will look realistic in front of a camera because it contains 3D information of the face. However, this approach lack of physiological characteristic and it is not easily available as compared to the previous two approaches.

To distinguish fake faces from live faces, the state-of-the-art methods, for example, can be classified into these categories:

1. Using depth information of the face. Reference is made to the papers written by Choudhury T., Clarkson B., Jebara T., Pentland A., "Multimodal person recognition using unconstrained audio and video," International Conference on Audio and Video-Based Biometric Person Authentication (AVBPA'99), pp. 176-181, Washington D.C., 1999. This method used the structure from motion, yielding the depth information of the face to detect live face or still image. The problem for this method is the depth information is hard to estimate when the head is still, and it is sensitive to noise and lighting condition;
2. Physiological characteristic. These methods use the non-rigid deformation and appearance change as the feature of live faces, such as facial expression variation, eye blinking Reference is made to papers written by Pan G., Sun L., Wu Z., and Lao S., "Eyeblink-based Anti-Spoofing in Face Recognition from a Generic Web Camera," the 11th IEEE International Conference on Computer Vision, Rio de Janeiro, October, 2007; and Kollreider K., Fronthaler H., and Bigun J., "Verifying Liveness by Multiple Experts in Face Biometrics," IEEE Computer Vision and Pattern Recognition Workshops, Anchorage, 2008;
3. Human computer interaction. These are interactive approaches require the user response to the system with an action. Reference is made to papers written by Chetty G., and Wagner M., "Liveness Verification in Audio-Video Speaker Authentication," In 10th Australian Int. Conference on Speech Science and Technology, December, 2004; and
4. Use additional hardware to detect fake faces vs. live faces, such as multi-model approach with special lighting condition, facial thermogram, and facial vein map. However, it is understood that such approach will add additional complication and cost to the mobile App and mobile device.

As mentioned above, depth information is hard to estimate and sensitive to noise, using additional hardware is not practical, and video is one way to attack the system that also present physiological characteristic. A simpler approach would be using human computer interaction for liveness detection in order to counter spoofing. The present invention includes modules for robust face tracking and head movement detection, which will be used to generate the human computer interaction request to determine whether the user is a real person or just a fake face.

There are situations that the face authentication or face liveness detection modules could fail, due to low quality images, illumination variation, occlusion, or other noises. In this situation, the App will provide an alternative solution, using other biometric modalities for data security protection, such as, voice recognition, since voice pattern can be conveniently collected by the mobile device. Such a system would be particularity useful during voice chatting or sending voice messages. Adding a voice authentication module would provide the user an option that only the voice of a valid user can be sent or conduct voice chatting, thus enabling user identity protection.

The present invention can be expanded to include biometric encryption for email services. Email is now the primary way for businesses communication. Financial documents, medical records, bank accounts information, legal files and other personal and confidential electronic data are regularly transmitted through emails. Using mobile device to send and receive emails is also becoming people's daily errands. Securing this information from sender to recipient is the key to avoid a data breach. Also, another priority is to ensure that businesses meet government regulations regarding the transmission of electronic data.

In addition, another objective of the present invention is to enable the App to provide other mobile Apps in the mobile device with data and identity protection. For example, mobile applications in the phone for storing personal data, contacts, appointments, photos, audio-video files, social networking accounts, and banking activities, etc. usually do not have any protection. The present invention can be a primary covered layer protection for such mobile Apps.

Referring to FIG. 1, it illustrates an example of a secured messaging communication system and process with biometric encryption and decryption, when using a live facial image as the biometric feature, in accordance with the present invention. When Bob wants to send Alice a secured message, he would select a desired biometric of Alice from his database 10. In this example, a face image is being used. This database could be a registered list of members who desire secured communication. Further, this database could be stored on Bob's PC, remote server, or any mobile devices. After Alice's face image has been selected, a request is sent to a server for biometric authentication 13. If the face image is authenticated, a public key 14 will be generated and sent to Bob's messaging device for encrypting the created message 11. The encrypted message 12 will be sent to Alice's device.

Once Alice has received the encrypted message 15, she would have to take a real-time face image from the camera 16 of her device. This live face image will be sent to the server as a request for face image validation 13. Only when this live face image is validated, a private key 19 will be released to Alice for decrypting the message. Then the decrypted message 20 can be read by Alice after decryption. For added security, a liveness detection 17 could be included in Alice's device to ensure the image from the camera is a live image 18. The live detection could detect a live biometric image continuously. If a live image is interrupted, the mobile device cannot decrypt the ciphertext even though the text was previously decrypted.

There are a variety of ways to generate private and public keys (14 and 19) for use with the present invention. For example:

1) Unique pair of private and public keys for Alice.

This is probably the most efficient method since Alice can obtain her private key one time and can use it forever. Bob needs to get the public key for the first email to Alice and can also reuse it forever; and 2) Unique pair of private and public keys for communication between Alice and Bob.

Under this method, different sender (e.g. Bob) will need to obtain different public key each time. This method is possibly useful for authentication of sender. Dynamically changing pair of private and public keys (with an expiration time stamp). This method is more secure because the private and public keys are only valid for a short period of time. The time period could be as short as per message basis. So, even if Alice loses the phone and the phone's secure storage is hacked into, the private key will still be useless.

Figure 2:
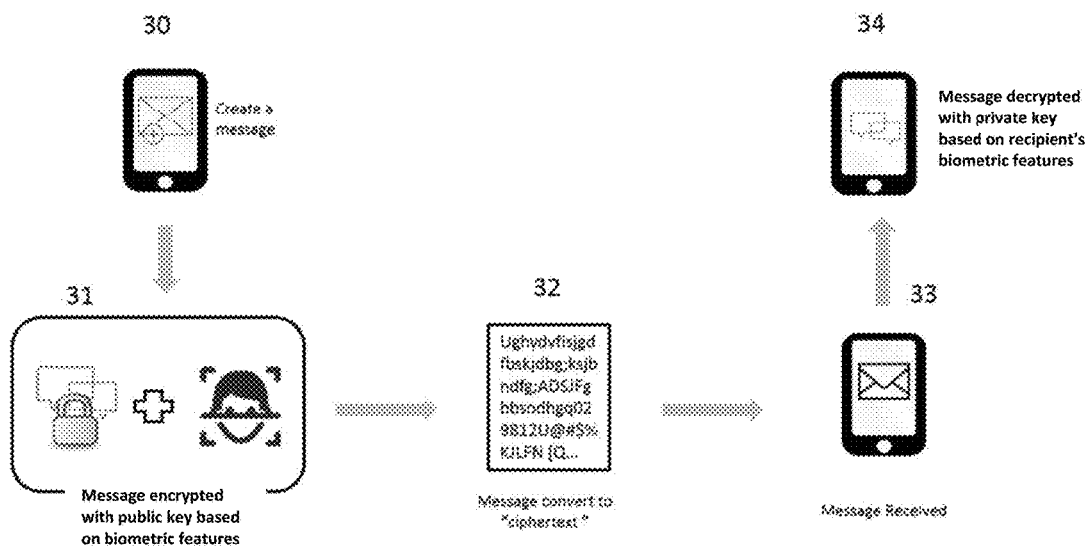
FIG. 2 is an example of the message encryption and decryption process using facial images.

Referring to FIG. 2, it is an illustration of a mobile message encryption application using facial image as a biometric feature. Reference 30 refers to the sender creating a message with a mobile device. Reference 31 refers to the message being encrypted and a public key generated with a validated facial image. Reference 32 refers to the encrypted message being converted to "ciphertext" after encryption. Reference 33 refers to the recipient receiving the message. Reference 34 refers to the recipient decrypting the message using his/her validated facial image together with a private key generated.

FIG. 3 illustrates face detection and tracking system using a mobile Device. The rectangle marked on the face image indicates the detection results of each organ on the face: left eye, right eye, nose and mouth. The line marked on the face images are the measurements used to determine the head movement and position. The circle on the left corner indicates the computational result of the face orientation. The head position estimation results in this example are: center (first image), left (second image), and upward (third image).

Multiple variations and modifications are possible in the embodiments of the present invention described above. Any type of biometric feature applicable of configuring a Private Key and/or a Public Key for biometric encryption, and any appropriate scheme described above are suitable for the authentication purpose discussed in the present invention.

Although certain illustrative embodiments of the invention have been shown and described here, a wide range of modifications, changes, and substitutions is contemplated in the foregoing disclosure. While the above description contains many specifics, these should not be construed as limitations on the scope of the invention, but rather as exemplifications of one or another preferred embodiment thereof. In some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

What we claim:

1. A method for secure data communication between a sender mobile device with a mobile App to a user mobile device with the mobile App, comprising the steps of:

selecting a user biometric data from a storage of a desired users from a storage of by the sender's mobile device;

sending the desired user biometric data to a server for validation;

requesting a public key by the sender if the validation is successful; creating an encrypted data in the sender mobile device when the public key based on the desired user's biometric data is received;

sending the encrypted data to the user mobile device through a secure data exchange section of the sender mobile device;

generating a live biometric data of the user in the user mobile device using a biometric sensor of the user mobile device when the encrypted data is received;

sending the live biometric data to the server for continuous authentication, and a request for a private key;

generating the private key by the server if the live biometric data authentication is successful;

decrypting the received encrypted data with the generated private key received; denying the request for a private key by the server for accessing and the decryption of the encrypted data if the live biometric data authentication of the live biometric data is not successful; and stopping the decrypting process if an unauthorized access is detected.

2. The method of claim 1, wherein the desired user biometric data and the live biometric data are facial images.

3. The method of claim 2, wherein the secured mobile App includes a biometric liveness detector.

4. The method of claim 3, further comprising:
using a biometric liveness detection scheme for the biometric liveness detector to detect spoofing for preventing the unauthorized access.

5. The method of claim 4, wherein the biometric sensor comprises a built-in camera of the mobile device for sending live facial images to the biometric liveness detector for authentication.

6. The method of claim 4, wherein the facial biometric liveness detection scheme utilizes a Local Binary Pattern (LBP) using distance-based matching algorithms.

7. The method of claim 6, wherein the distance-based matching algorithms comprising the steps of:
tracking the facial features on two consecutive frames of a video stream;
tracking a position of a facial image on a previous frame;
tracking a position of the facial image on a consecutive current frame;
measuring a distance of corresponding pixels of the two consecutive frames;
matching the positions between the consecutive current frame and the previous frame; and
generating an authenticated facial liveness image.

8. A system for secure data communication between a sender mobile device with a mobile App and a user mobile device with the mobile App, comprising:
a biometric data validator for validating a desired user; connects to a user a biometric data storage of the sender for sending the desired user's biometric data to the biometric data validator;
a public key generator for generating a public key when a successful desired user's biometric data validation signal is received from the biometric data validator;
a live biometric detector is connected to a user mobile device camera for continuously sending a live image to the biometric data validator;
a private key generator for generating a private key when a successful live image validation signal is received from the biometric data validator;
an encryption data generator for generating an encrypted file when the public key is received or when the live image validation is lost;
a data exchange generator for sending the encrypted file, from sender mobile device, to the user mobile device; and
a decryption data generator for decrypting the encrypted file when the private key is successfully generated.

9. The system of claim 8, wherein the user sends a live biometric feature to the live biometric detector for authentication; and
a request for a private key when the encrypted data is received from the sender mobile device.

10. The system of claim 9, wherein the user mobile device decrypts the encrypted data with the private key received after the live biometric feature has been authenticated.

11. The system of claim 8, wherein the image liveness detector utilizes a Local Binary Pattern (LBP) method for the live facial image authentication.

* * * * *